United States Patent
Roy et al.

(10) Patent No.: US 7,180,858 B1
(45) Date of Patent: Feb. 20, 2007

(54) TOOL FOR MEASURING AVAILABLE BANDWIDTH IN COMPUTER NETWORKS

(75) Inventors: Soumya Roy, Santa Cruz, CA (US); Jose J. Garcie-Luna-Aceves, San Mateo, CA (US)

(73) Assignee: Adara Networks, Inc., Scotts Valley, CA (US)

( * ) Notice: Subject to any disclaimer, the term of this patent is extended or adjusted under 35 U.S.C. 154(b) by 806 days.

(21) Appl. No.: 10/033,502

(22) Filed: Dec. 27, 2001

Related U.S. Application Data (60) Provisional application No. 60/323,113, filed on Sep. 10, 2001.

(51) Int. Cl.
*G01R 31/08* (2006.01)

(52) U.S. Cl. .............. 370/232; 370/230; 370/252; 370/229

(58) Field of Classification Search ........... 370/229, 370/230, 232, 468, 252, 235
See application file for complete search history.

(56) References Cited

U.S. PATENT DOCUMENTS

| | | | | |
|---|---|---|---|---|
| 5,400,329 | A * | 3/1995 | Tokura et al. | 370/232 |
| 5,867,483 | A * | 2/1999 | Ennis et al. | 370/252 |
| 5,913,151 | A * | 6/1999 | Lusignan | 455/3.01 |
| 6,215,772 | B1 * | 4/2001 | Verma | 370/236 |
| 6,412,013 | B1 * | 6/2002 | Parthasarathy et al. | 709/235 |
| 6,477,143 | B1 * | 11/2002 | Ginossar | 370/230 |
| 6,614,763 | B1 * | 9/2003 | Kikuchi et al. | 370/252 |
| 6,813,244 | B1 * | 11/2004 | He et al. | 370/235 |
| 2002/0044528 | A1 * | 4/2002 | Pogrebinsky et al. | 370/230 |

OTHER PUBLICATIONS

V. Jacobsen, "pathchar—a tool to infer characteristics of Internet paths," Presented at Mathematical Sciences Research Institute (MSRI), pp. 1-21 (Apr. 21, 1997).

Bruce A. Mah, "Pchar: Child of Pathchar," Security and Networking Research Department (8910), Sandia National Laboratories, California (Jul. 21, 1999).

A.B. Downey, "Using pathchar to estimate Internet link characteristics", ACM Sigcomm, Aug. 1999.

Kevin Lai and Mary Baker, "Measuring link bandwidths using a deterministic model of packet delay," ACM Sigcomm 2000 (Aug. 2000).

V. Jacobson, et al., "Congestion avoidance and control", ACM SIGCOMM Computer Communication Review, Symposium proceedings on Communications architectures and protocols SIGCOMM '88, vol. 18 Issue 4 (Nov. 1988).

(Continued)

*Primary Examiner*—Doris H. To
*Assistant Examiner*—Steve Blount
(74) *Attorney, Agent, or Firm*—Blakely, Sokoloff, Taylor & Zafman LLP (57) ABSTRACT

The available bandwidth of a communication path between two nodes of a computer network is determined using probe packages that are transmitted between a sender one of the nodes and a receiver one of the nodes at varying transmission rates. Each successive transmission rate of the probe packages is selected according to: (i) an achieved throughput for a transmission of a preceding one of the probe packages, and (ii) a deviation between the achieved throughput for the transmission of the preceding one of the probe packages and a corresponding transmission rate of the preceding one of the probe packages.

17 Claims, 10 Drawing Sheets

OTHER PUBLICATIONS

V. Paxson, "End-to-end Internet packet dynamics", Proceedings of the ACM SIGCOMM '97 conference on Applications, Technologies, Architectures, and Protocols for Computer Communication (Jun. 23, 1997).

R.L. Carter and M. Crovella, "Dynamic server selection using bandwidth probing in wide area networks", BU-CS-96-007 (Mar. 18, 1996).

C. Dovrolis, P. Ramanathan, and D. Moore, What do packet dispersion techniques measure?, Proceedings of IEEE Infocom'01 (2001).

J.C. Bolot, "Characterizing end-to-end packet delay and loss in the Internet," Journal of High Speed Networks, vol. 2, No. 3, pp. 305-323 (Dec. 1993).

L. Zhang et al., "Observations on the dynamics of a congestion control algorithm: The effects of two way traffic", ACM Sigcomm (Sep. 1991).

"Bprobe and cprobe—Network Probe Tools Home Page," available at http://cs-people.bu.edu/carter/tools/Tools.html (prior to filing date).

Constantinos Dovrolis & Ravi Prasad, "Pathrate: A measurement tool for the capacity of network paths", available at http://www-static.cc.gatech.edu/fac/Constantinos.Dovrolis/parthrate.html (Jan. 2004).

S. Keshav, "A control-theoretic approach to flow control," ACM Sigcomm, Sep. 1991.

David D. Clark, Mark L. Lambert, Lixia Zhang, "NETBLT: A Bulk Data Transfer Protocol," RFC 998 (Mar. 1987).

Constantinos Dovrolis, "BW-meter project (pathrate and pathload)," pp. 1-2 (Jul. 2001).

Bruce A. Mah, "pcharpchar: A Tool for Measureing Internet Path Characteristics," (Jun. 13, 2001).

* cited by examiner

```
01  Procedure Receiver_Initialize(sender)

02  open up TCP socket with the sender
03  open up UDP socket
04  rnd_no ← 0
```

Fig. 8

Procedure exp_growth()
global constants : fraction_start, increase_factor, fixed_minimum_rate

```
01  when Sender initiates connection
02      receiver acks and asks sender for bottleneck bandwidth
03      wait for bottleneck bandwidth information from sender
04      receives bottleneck bandwidth information
05  if (bottleneck bandwidth available)
06      start_sending_rate = fraction_start*bottleneck bandwidth
07      increase_factor = 2
08  else
09      start_sending_rate = fixed_minimum_rate
10      increase_factor = 10
11  control_info.sending_rate = start_sending_rate
12  control_info.time = random(min_duration, max_duration)
13  control_info.rnd = ++rnd
13  send control_info to the sender
14  listen to probe packets on UDP socket and control packets on TCP socket
15  if (received probe_packet)
16      if (probe_packet is first packet of rnd)
17          t_first ← time when received
18          seq_first ← sequence number of packet
16      if (probe_packet is last packet of rnd)
17          t_last ← time when received
18          seq_last ← sequence number of packet
19      if (packet.seq_no < sequence number of last packet of same rnd)
19          packet_reordering ← TRUE
20      if (received control_packet)
21          total_sent_bytes = control_packet.total_bytes
22      if (seq_last < pktID AND total_sent_bytes > total_recvd_bytes)
23          packet_loss ← TRUE
24  if (packet_loss || packet_reordering)
25      try one more round if not already tried for 3 rounds with same sending rate
26      control_info.sending_rate = last_sending_rate
27      control_info.rnd = ++rnd
28      control_info.time = random(min_duration, max_duration)
29      go to 13
cont'd next page
```

Fig. 9a

| Procedure exp_growth() contd... |
|---|
| 30  else |
| 31      achieved throughput = total_sent_bytes/(t_last – t_first) |
| 32      if((achieved throughput - sent rate)/sent rate) * 100 < ε |
| 33          control_info.sending_rate = increase_factor*last_sending_rate |
| 34          control_info.rnd = ++rnd |
| 35          control_info.time = random(min_duration, max_duration) |
| 36          min_range = control_info.sending_rate |
| 37          if(control_info.sending_rate > bottleneck bandwidth) |
| 38              max_range ← bottleneck bandwidth |
| 39          else |
| 40              go to 13 |
| 41          return min_range, max_range |
| 42      else |
| 43          max_range ← control_info.sending_rate |
| 44          return min_range, max_range |

Fig. 9b

```
Procedure fine_granular_search()
global constants : fraction_start, increase_factor, fixed_minimum_rate
                   min_duration, max_duration, acceptable_fraction
                   no_bw_acceptable_fraction 01  range ← max_range – min_range
02  control_info.sending_rate ← min_range + range/2
03  control_info.time = random(min_duration, max_duration)
04  control_info.rnd = ++rnd
05  send control_info to the sender
06  listen to probe packets on UDP socket and control packets on TCP socket
07  if (received probe_packet)
08      if (probe_packet is first packet of rnd)
09          t_first ← time when received
10          seq_first ← sequence number of packet
11      if (probe_packet is last packet of rnd)
12          t_last ← time when received
13          seq_last ← sequence number of packet
14      if (packet.seq_no < sequence number of last packet of same rnd)
15          packet_reordering ← TRUE
16      if (received control_packet)
17          total_sent_bytes = control_packet.total_bytes
18          if (seq_last < pktID AND total_sent_bytes > total_recvd_bytes)
19              packet_loss ← TRUE
20  if (packet_loss || packet_reordering)
21      try one more round if not already tried for 3 rounds with same sending rate
22      control_info.sending_rate = last_sending_rate
24      control_info.rnd = ++rnd
25      control_info.time = random(min_duration, max_duration)
26      go to 13
27  else
28      achieved throughput = total_sent_bytes/(t_last – t_first)
29      if((achieved throughput – sent rate)/sent rate) * 100 < ε
30          min_range ← current_sending_rate
contd next page
```

Fig. 10a

| | Procedure fine_granular_search() contd.... |
|---|---|
| 31 | control_info.sending_rate = min_range + range/2 |
| 32 | range = max_range - min_range |
| 33 | if (bottleneck bandwidth information available) |
| 34 | if (range/bottleneck_bandwidth < acceptable_fraction) |
| 35 | return min_range + range/2 |
| 36 | else |
| 37 | control_info.time = random(min_duration, max_duration) |
| 38 | control_info.rnd = ++rnd |
| 39 | go to Line 5 |
| 40 | else |
| 41 | if (range/min_range_bandwidth < no_bw_acceptable_fraction) |
| 42 | return min_range + range/2 |
| 43 | else |
| 44 | control_info.time = random(min_duration, max_duration) |
| 45 | control_info.rnd = ++rnd |
| 46 | go to Line 5 |
| 47 | else |
| 48 | max_range *left arrow* current_sending_rate |
| 49 | range = max_range - min_range |
| 50 | control_info.sending_rate = min_range + range/2 |

Fig. 10b

Procedure sender(receiver)
global constants : fraction_start, increase_factor, fixed_minimum_rate
 min_duration, max_duration, acceptable_fraction
 no_bw_acceptable_fraction, pkt_size

---

01 Initiate tcp connection with the receiver
02 After Receiver acks
03   open UDP socket for sending probe packets
04   sends receiver information about bottleneck bandwidth if available
05   when control_info is received over the tcp channel, terminates if received TERMINATION signal, prints the available bandwidth information provided by the sender
06     sending_rate = control_info.sending_rate
07     tot_time = control_info.time
08     rnd_no = control_info.rnd
09 avg_pkt_rate = sending_rate/packet_size
10 pkt_id = 0
10 starting_time = PRESENT_TIME
11 prepare a pkt
12 pkt.pkt_id = pkt_id
13 pkt.rnd = rnd_no
14 pkt.size = pkt_size
15 send the packet
16 if (PRESENT_TIME - starting_time) < tot_time
17     wait(1/avg_pkt_rate)
18 else
19     control_info.sending_rate = sending_rate
20     control_info.time = PRESENT_TIME - starting_time
21     control_info.rnd = rnd_no
22     control_info.last_id = pkt_id

Fig. 11

TOOL FOR MEASURING AVAILABLE BANDWIDTH IN COMPUTER NETWORKS

RELATED APPLICATION

This application is related to and hereby claims the priority date of co-pending and commonly-owned U.S. Provisional Application No. 60/323,113, entitled "A Tool for Measuring the Available Bandwidth in Computer Networks" filed Sep. 10, 2001, by the present inventors.

FIELD OF THE INVENTION

The present invention relates to a methodology for estimating available bandwidth in a communication path coupling two nodes of a computer network.

BACKGROUND

Bandwidth measurements in computer networks include measurements of available bandwidth, bottleneck bandwidth, and link bandwidth. In the lexicon of such measurements, "peak bandwidth" usually refers to the maximum throughput theoretically achievable along any path at any time, while "available bandwidth" refers to the maximum throughput possible along a path under current network conditions. "Link bandwidth" measurement refers to measurements of bandwidth along each link in a given communication path to a destination.

Tools such as "pathchar" (see, V. Jacobsen, "pathchar—a tool to infer characteristics of Internet paths", in *Presented at Mathematical Sciences Research Institute* (MSRI), April 1997), "pchar" (see, B. A. Mah, "pchar", available at http://www.employees. org/~bmah/Software/pchar/, June 2001), "clink" (see, A. B. Downey, "Using pathchar to estimate Internet link characteristics", *ACM Sigcomm*, August 1999), and "nettimer" (see, K. Lai and M. Baker, "Measuring link bandwidths using a deterministic model of packet delay", *ACM Sigcomm* 2000, August 2000) use the variations of the observed one-way delay with increased packet size to measure the link bandwidth. After measuring link-specific bandwidth(s), it is easy to find the bottleneck bandwidth. However, this method is not attractive for measuring only the bottleneck bandwidth or available bandwidth because the probing consumes a substantial amount of bandwidth and most of the information obtained would be redundant. Also, the efficacy of such methods for estimating link bandwidths decreases with increasing path lengths.

The classic packet-pair technique (see, V. Jacobsen, "Congestion avoidance and control", *ACM Sigcomm*, August 1998) is mainly used in different forms for measuring bottleneck bandwidth. Examples of such use may be found in V. Paxson, "End-to-end Internet packet dynamics", *IEEE/ACM Transactions on Networking*, 1993; R. L. Carter and M. Crovella, "Dynamic server selection using bandwidth probing in wide area networks", BU-CS-96-007, March 1996; C. Dovrolis et al., "What do packet dispersion techniques measure?", *IEEE Infocom*, April 2001; and J. C. Bolot, "Characterizing end-to-end packet delay and loss in the Internet", *Journal of High Speed Networks*, 1993. The fundamental idea behind using the packet-pair technique is that two packets sent between a sender node and a receiver node at a rate higher than the bottleneck bandwidth will be spread out in time at the bottleneck by the transmission delay of the first packet and the spacing will remain unaltered after the bottleneck. If the time spacing between the arrival of the last bit of the first packet and the last bit of the second packet is $t_b$ at the receiver, then the bottleneck bandwidth will be $b/t_b$, where b is the size of the second packet. Variation of the value of $t_b$ can lead to the estimation of the available bandwidth, but if the goal of the experiment is to estimate the bottleneck bandwidth, the effect of noise has to be removed.

Several issues have to be addressed for practical implementation of the packet-pair technique. As pointed out by Dovrolis et al., devising a correct method to detect the bottleneck bandwidth has become challenging over the years, primarily because the bottleneck bandwidth is no longer a standard value (e.g., 56 kbps for modems, ISDN links or T1 links) and can take on any value up to the physical capacity of the links in the communication path.

If the sending rate is smaller than the bottleneck bandwidth, then the packets may not get queued up at the bottleneck link and the spacing of the consecutive packets will reflect the sending rate, rather than the bottleneck bandwidth. In such a case, the size of the packets can be made larger to force the packets to queue up at the bottleneck. The disadvantage of this scheme is that the probability of arrival of cross traffic at the bottleneck bandwidth during the transmission of the first probe packet increases as the packet size gets larger and, hence, the spacing between consecutive probe packets will be longer, indicating (falsely) a lower estimated bandwidth.

If packets get dropped or re-ordered, no result can be obtained and also there is no exact method to remove these effects. Increasing the number of samples, or varying the size of the probe packets can only minimize the effect.

One basic assumption behind using the packet pair technique for correct estimation of the bottleneck bandwidth is that the probe packets should get queued one after another at the bottleneck. However, if competing traffic is present, then this may not always be true. So, statistical measures need to be devised, as provided by Carter and Crovella and Dovrolis et al., to remove the effects of noise due to competing traffic and estimate the correct value.

Paxson has noticed that consecutive probe packets may not follow the same path in ISDN links due to the use of multiple channels, leading to incorrect estimates. This can also happen due to load balancing or route changes, where the assumption that the path followed by consecutive probe packets is the same becomes invalid.

By sending a set of packets with the size of the set being one bigger than the number of multiple links, the effects due to multi-channel links can be addressed. This technique, called Packet Bunch Mode (PBM) has been proposed by Paxson. As the route changes may not be frequent, outliers created by itself may not be persisting and hence good statistical measures can remove the effect of this. The effect of load balancing can also be addressed using the PBM technique.

There is an unfortunate side effect of using PBM or using packet trains. Dovrolis et al., have found that increasing packet trains can lead to under-estimation of capacity. This is because packet trains undergo additional dispersion (spacing) than packet pairs, due to presence of cross traffic.

When $\Delta T_b$ (time interval between consecutive probe packets at the bottleneck) is altered in the links after the bottleneck bandwidth, it will result in erroneous estimations that can happen due to the following reasons:

1. Asymmetric path/links: When probe packets are sent by a source and echoed by the receiver, the spacing between received packets at the sender may not always reflect the spacing on the forward path. The bottleneck bandwidth in the reverse path can be different from that in the forward path and this can happen due to asymmetric path or links like ADSL and satellite links. Also Acknowledgement (ACK) compression (see, L. Zhang et al., "Observations on the dynamics of a congestion control algorithm: The effects of two way traffic", *ACM Sigcomm*, September 1991) and processing delay at the receiver before echoing probe packets can further distort the spacing. Therefore, a receiver-based scheme where the spacing between probe packets is measured at the receiver would tend to be more accurate.

2. Congestion in downstream nodes: This can lead to under-estimation of bottleneck bandwidth when packets get delayed further or over-estimation due to timing compression (see, Paxson). Dovrolis et al. have indicated that the later effect becomes more significant when the size of the probe packets is small.

Statistical methodologies combined with the packet train approach can effectively minimize these effects.

If the bottleneck bandwidth is too large to be measured using the system clock, then the estimate will be not be correct for high bandwidth values. A solution is to send a bunch of packets so that total time spacing will be greater than clock resolution. This effect can also be addressed using probe packets of larger size. Both solutions will incur noise due to interfering traffic at the bottleneck link.

Due to changes in infrastructure or routing table changes, bottleneck bandwidth may change. However, as these effects will not be persistent, statistical measures can easily detect this.

User level stamping can produce over-estimations, when the kernel delivers packet back to back to the application layer.

Dovrolis et al. and Carter and Crovella have shown that the histogram of bottleneck bandwidth can lead to multiple modes and some local modes, which are more dependent on the cross traffic, are stronger than the mode for the bottleneck link. This is true even if the assumption is that there exists a single channel between the sender and the receiver. Paxson has attributed the multiple modes present in the observations to the change of the bottleneck link speed during the probing period or presence of multiple channels. However the interpretation of the data based on this assumption alone will be erroneous given that multiple modes occur due to presence of cross traffic. Dovrolis et al. and Carter and Crovella both have used filtering techniques to eliminate wrong modes.

Bprobe (see, Bolot, supra and B. Carter, "bprobe and cprobe", available at http://cs-people.bu.edu/carter/tools/Tools.html) estimates the maximum possible bandwidth along a given path and cprobe estimates the current congestion along a path. Currently these tools rely on two features of the IRIX operating system for SGI hardware:

A high precision timer which provides finer granularity timing of the probe packets. Specifically, where the usual timer resolution of a system clock is tens of milliseconds, these tools are based on an SGI memory-mapped device having a resolution of 40 nanoseconds.

The ability to change the priority of the process to facilitate accurate timing such that the measurement process does not become context-switched out while measuring.

Bprobe uses filtering to take care of underestimated and overestimated values. Their approach is based on simple union or intersection of different estimates obtained in the simulations. The union and intersection are done with different sets of measurements, with each set consisting of varying sized probe packets. The intersection filtering tries to find the intersection of the sets i.e., the estimate that occurs in all sets. The union filtering method combines overlapping intervals and selects an interval as the final one if enough sets contribute to it.

Pathrate (see, Dovrolis et al., supra and C. Dovrolis, "pathrate: A measurement tool for the capacity of network paths", available at http://www.cis/udel/edu/~dovrolis/bw-meter.html (July 2001)) is a receiver-based tool that tries to find the mode corresponding to the capacity mode of the path (i.e. the bottleneck bandwidth value). pathrate uses UDP packets for probing the path's bandwidth, and it also establishes a TCP connection between the two hosts for control purposes. The following features have been utilized by Dovrolis et al. to eliminate unwanted modes:

With small packet trains (length=2 implies packet pair) some modes higher than the capacity mode appears.

When longer trains of packet are sent for estimation, it leads to modes less than the capacity mode and these local modes are termed as Sub-Capacity Dispersion Range (SCDR). (Because longer packet trains experience more cross traffic, under-estimation occurs).

When the packet trains are very long, the distribution becomes unimodal and the mode corresponding to that is SCDR and the mode does not change with variation of length of packet train.

Dovrolis et al. have used these observations to come up with the determination of Capacity mode and have implemented their technique in pathrate. Pathrate gives accurate results and the level of accuracy is dependent on the resolution of bandwidth measurements. This work is quite robust, in the sense it deals with measures to take care of cross traffic unlike bprobe whose solution does not utilize any property of variation of the observed values due to the presence of cross traffic.

However there are several issues in using pathrate for actual measurements, namely:

1. It is important to run pathrate from relatively idle hosts. It should not be run if CPU or I/O intensive processes are running because they will interact with pathrate's user-level packet time-stamping, and the results obtained will not be accurate. If pathrate is running in a machine devoted to significant processing, it will steal many CPU cycles from the other important processes that are the most CPU and I/O intensive. This implies a separate module on the same LAN would be ideal choice for measurements so as to offload the router.

2. For heavily loaded paths, pathrate can take a long time (about 30 minutes) until it reports a final estimate.

3. Pathrate is a receiver-based scheme that implies that it cannot be utilized for measurement outside the network where the senders and the receivers do not cooperate.

Bottleneck bandwidth gives the capacity of the path, i.e., the maximum bandwidth achievable in the absence of cross traffic, while the available bandwidth is the maximum throughput that can be obtained, given the current network conditions.

Assuming rate-allocating servers (RAS) (see, S. Keshav, "A control-theoretic approach to flow control", *ACM Sigcomm*, September 1991), the packet pair technique can give an idea regarding the fair share of bandwidth or the available bandwidth. However, the queues in the Internet are mainly FCFS servers. Accordingly the packet pair technique will not be useful for measuring available bandwidth.

Some of the methods used in the previous art for determining the available bandwidth are the following:

1. cprobe, a tool developed by Carter and Crovella that calculates the time taken to transfer a packet train of eight packets and uses that value along with the total number of bytes transfered to determine the available bandwidth. For that the bottleneck bandwidth needs to be determined first, so that the sending rate at the sender is greater than the bottleneck bandwidth.
2. ssthresh variable in TCP's slow-start phase, which should ideally be set to the product of the connection's RTT with the available bandwidth, can be determined from the dispersion of the first three or four ACKs (see Dovrolis et al.).
3. Based on the idea that the variation of end-to-end delay of a packet is due to the variation of queuing at the intermediate routers, Paxson has used the variation of one-way transit time (OTT) to estimate the available bandwidth.

The basic assumption behind the first two methods is that the packet dispersion suffered by long packet trains is inversely proportional to the available bandwidth. Through a model of single link network, Dovrolis et al. have shown why the dispersion suffered by long packet trains is not proportional to the available bandwidth. Through experiments Dovrolis et al. have also found that any method similar to cprobe will over-estimate the available bandwidth, though no solution was proposed for correctly determining the available bandwidth.

The third method is difficult to implement, as this method will give rise to some important issues, one of which is measurement of OTT that requires a detailed clock synchronization mechanism between the source and the receiver.

NETBLT (Network Block Transfer Protocol) (see, D. D. Clark, M. L. Lambert, L. Zhang, RFC 998 "NETBLT: A Bulk Data Transfer Protocol") is a transport level protocol that is intended for rapid transfers of large quantities of data between two end points of the Internet. The two end points negotiate on the transmission parameters (burst size, burst interval and number of outstanding buffers) and deliver data on a buffer-by-buffer basis rather via a window-based scheme. However, NETBLT lacks a method for dynamic selection and control of transmission parameters so as to modify the transmission scheme based on congestion in the network. Moreover, buffer-based schemes as used in NETBLT cannot be adopted for real time data transfer (where estimated available bandwidth information would be necessary).

SUMMARY OF THE INVENTION

In accordance with an embodiment of the present invention, the available bandwidth of a communication path between two nodes of a computer network communicatively coupled by the communication path is determined using probe packages (which may include a number of packets, for example UDP packets) that are transmitted between a sender one of the nodes and a receiver one of the nodes via the communication path at varying transmission rates. Each successive transmission rate of the probe packages is selected according to: (i) an achieved throughput for a transmission of a preceding one of the probe packages, and (ii) a deviation between the achieved throughput for the transmission of the preceding one of the probe packages and a corresponding transmission rate of the preceding one of the probe packages.

Selecting the initial transmission rate for the probe packages may be performed with or without knowledge of the bottleneck bandwidth of the communication path. Where the bottleneck bandwidth is known, prior to transmission of the initial probe package the receiver one of the nodes is advised of that bottleneck bandwidth. In addition, the receiver one of the nodes instructs the sender one of the nodes regarding a transmission rate to use for the initial probe package. Then, following transmission of the probe package, the sender one of the nodes advises the receiver one of the nodes of the number of packets comprising each of the probe packages. Preferably, such communications between the two nodes takes place over a control channel using a reliable transmission protocol, such as the transmission control protocol (TCP).

BRIEF DESCRIPTION OF THE DRAWINGS

The present invention is illustrated by way of example, and not limitation, in the figures of the accompanying drawings in which:

FIGS. 9a and 9b present a pseudo-code implementation of an algorithm that is used at the receiver end for estimating available bandwidth of a communication path between a sender node and a receiver node that is an embodiment of the present invention;

DETAILED DESCRIPTION

Described herein is a scheme for finding the available bandwidth along any communication path between two end points on a computer network or internetwork such as the Internet. The present process makes use of a probing process wherein probe packages (made of up one or more packets) are transmitted between the end points of interest at varying transmission rates. The algorithm which defines the probing process can either run at the two end points, called the sender and receiver nodes, or can be run only at the sender. The sender sends packets to the receiver at increasing rates and adapts to the network conditions while searching for the point (i.e., the probe packet transmission rate) at which the probe packets start creating congestion within the communication path. That point of operation, where an increased rate of probing starts producing congestion, will give an estimate of the maximum available bandwidth for the communication path under current network conditions. Based on this available bandwidth, routing decisions can be made. For example, streaming applications can choose the best paths for transferring streams that demand high bandwidth.

Some portions of the detailed description that follows are presented in terms of algorithms and symbolic representations of operations on data within a computer memory. These algorithmic descriptions and representations (e.g., in the form of flowcharts) are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Further, unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Unlike some other bandwidth estimation techniques, the present invention does not need any clock synchronization between the sender and the receiver nodes. Nor do the algorithms that are embodiments of the present invention make any assumptions that the total dispersion suffered by a packet train is proportional to the available bandwidth. Instead, the present algorithms rely on actual observations of the achieved throughput of the probe packages. For example, while searching for the transmission rate at which the probe packets start creating congestion within the communication path, succeeding probe package transmission rates are selected according to: (i) an achieved bandwidth for a transmission of a preceding one of the probe packages, and (ii) a deviation between the achieved bandwidth for the transmission of the preceding one of the probe packages and a corresponding transmission rate of the preceding one of the probe packages.

As further explained below, the transmission rates are increased for successive transmissions of probe packages until a probe package transmission rate ($t_s$) exceeds a corresponding achieved probe package throughput ($t_e$) over the communication path. Once $t_s$ exceeds $t_e$, the varying transmission rates are increased over a last transmission rate ($t_r$) for which the probe package transmission rate did not exceed a corresponding achieved probe package throughput over the communication path by a fraction (e.g., half) of a transmission rate range defined by a difference between $t_s$, and $t_r$ until $t_s$ no longer exceeds $t_r$.

Thereafter, $t_s$ is used as a new value for $t_r$ and the varying transmission rates are again increased up to an estimated available bandwidth of the communication path by adding the fraction of the transmission rate range to this new value of $t_r$. The estimated available bandwidth of the communication path is then determined as being one of (i) an acceptable fraction of a bottleneck bandwidth of the communication path, or (ii) a value of the achieved probe packet throughput that is within an acceptable percentage of its corresponding probe package transmission rate.

The basic idea behind determining any metric in a network using active measurements is that the measurements performed should not disturb what is being measured. In case of the cprobe or ssthresh methods, discussed above, correct values for the available bandwidth are not predicted because the traffic used to measure that available bandwidth disturbs the existing traffic patterns when the probe traffic is sent at a rate higher than the available bandwidth. This problem is avoided using the methods of the present invention.

Figure 1:
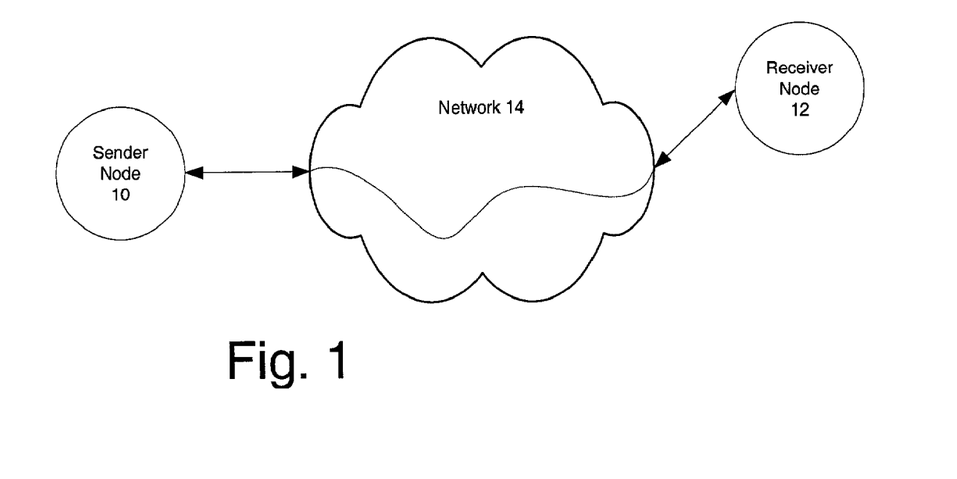
FIG. 1 illustrates a network configuration in which a sender node and a receiver node communicate with one another across communication paths within a network.

To illustrate the above, refer to FIG. 1 and assume that the available bandwidth of a communication path between a sender node 10 and a receiver node 12 across a network 14 is $b_a$. Now, as illustrated graphically in FIG. 2, if the transmission rate of the probe traffic, $b_s$ is less than $b_a$, then the probe traffic pattern does not change the utilization of the existing links. By utilization we mean the (useful traffic)/(link bandwidth), which excludes the probe traffic. However if $b_s > b_a$, then the probe traffic is basically using more than the available bandwidth, thereby penalizing the existing traffic patterns and hence the links will be underutilized.

Figure 2:
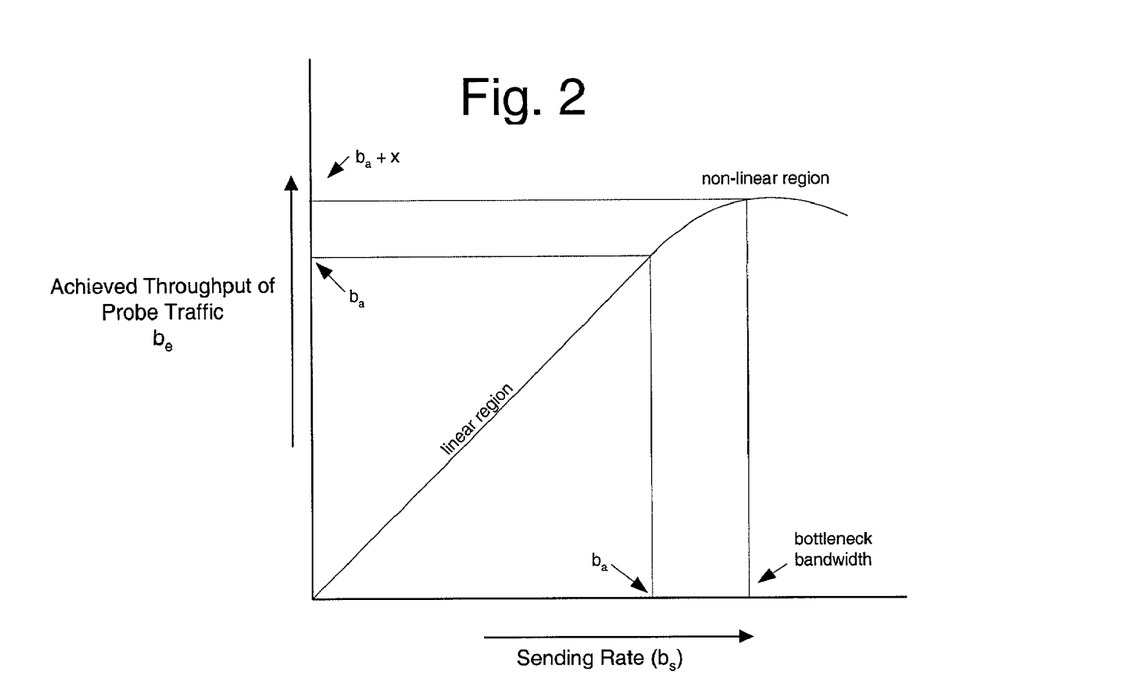
FIG. 2 illustrates graphically the variation in achieved throughput of probe traffic as a function of transmission rate for such traffic sent between a transmitting node and a receiving node over a communication path.

As FIG. 2 illustrates, as long as $b_s$ is less than $b_a$, the achieved throughput $b_e$=(measured dispersion)/(bytes transferred) should also be $b_s$, because it is still using a portion of available bandwidth. The measured dispersion refers to the time difference between the arrival of the first byte of the first packet and the arrival of the last byte of last packet. Due to the bursty nature of traffic, this may not be always true, however averaging measurements taken over a significant time scale should eliminate this effect. However, once $b_s$, is greater than $b_a$, then the available dispersion becomes unpredictable and $b_e$ does not increase with the same gradient (which was ideally 45 degrees). This is because the probe traffic creates congestion for the existing traffic at $b_s > b_a$ and introduces extra traffic that accounts for an increase in the achieved throughput, though the increase will not be the same as the increase in the sending rate. Hence, the maximum sending rate at which the achieved throughput is equal to that transmission rate will be the maximum available bandwidth of the communication path (under current network conditions).

The following assumptions are made with respect to the present invention:

The bottleneck bandwidth may or may not be known. Recall that for the tool used by Carter and Crovella, the bottleneck bandwidth must be known. Here, the present invention may be used efficiently if the bottleneck bandwidth of the communication path is known, as this knowledge will assist in setting an initial transmission rate (and later in estimating the available bandwidth), thus allowing the algorithm to converge more quickly than would otherwise be the case. If the bottleneck bandwidth is not known, then the present algorithms can still be used, though the time required to converge to an estimate of the available bandwidth may be longer.

The receiver also helps in measurements. A purely sender-based scheme may not give correct results, because the reverse path dynamics can lead to wrong inferences of forward path characteristics. Thus, it is preferable if the receiver provides feedback in the setting of new transmission rates.

The available bandwidth of the communication path does not change continuously during the course of the measurements. If this condition is not true, the present algorithms may not converge to a final estimate of the available bandwidth.

As explained in detail below, during the measurement process the receiver dictates the rate at which the sender should transmit the probe packages (which may be made up of a number of packets) and this exchange of control information occurs over a reliable TCP (transmission control protocol) connection between the sender and the receiver. Following transmission of the probe packages, the sender notifies the receiver about its sending rate, so that based on the achieved throughput of the probe packages, i.e., the throughput as seen by the receiver, the later can make decisions regarding whether and how to continue the measurements. The information regarding the number of packages transmitted and the corresponding transmission rates is provided by the sender to the receiver over the TCP connection.

The measurement process starts with an initial rate of probing that is very slow. The starting value can be kept at a small fraction of the bottleneck bandwidth (e.g., $\frac{1}{20}$ of $b_a$), if bottleneck bandwidth information is available. Here the information regarding the bottleneck bandwidth value helps the algorithm converge faster. For example, if the available bandwidth of a path is 100 Mbps, and the initial transmission rate of the probe packages is 10 kbps, then the number of iterations required for the algorithm to converge would be higher than would be the case if the initial transmission rate were 5 Mbps. Nonetheless, the algorithm can be utilized without knowledge of the bottleneck bandwidth and in such cases a very slow initial transmission rate can be used.

Figure 3:
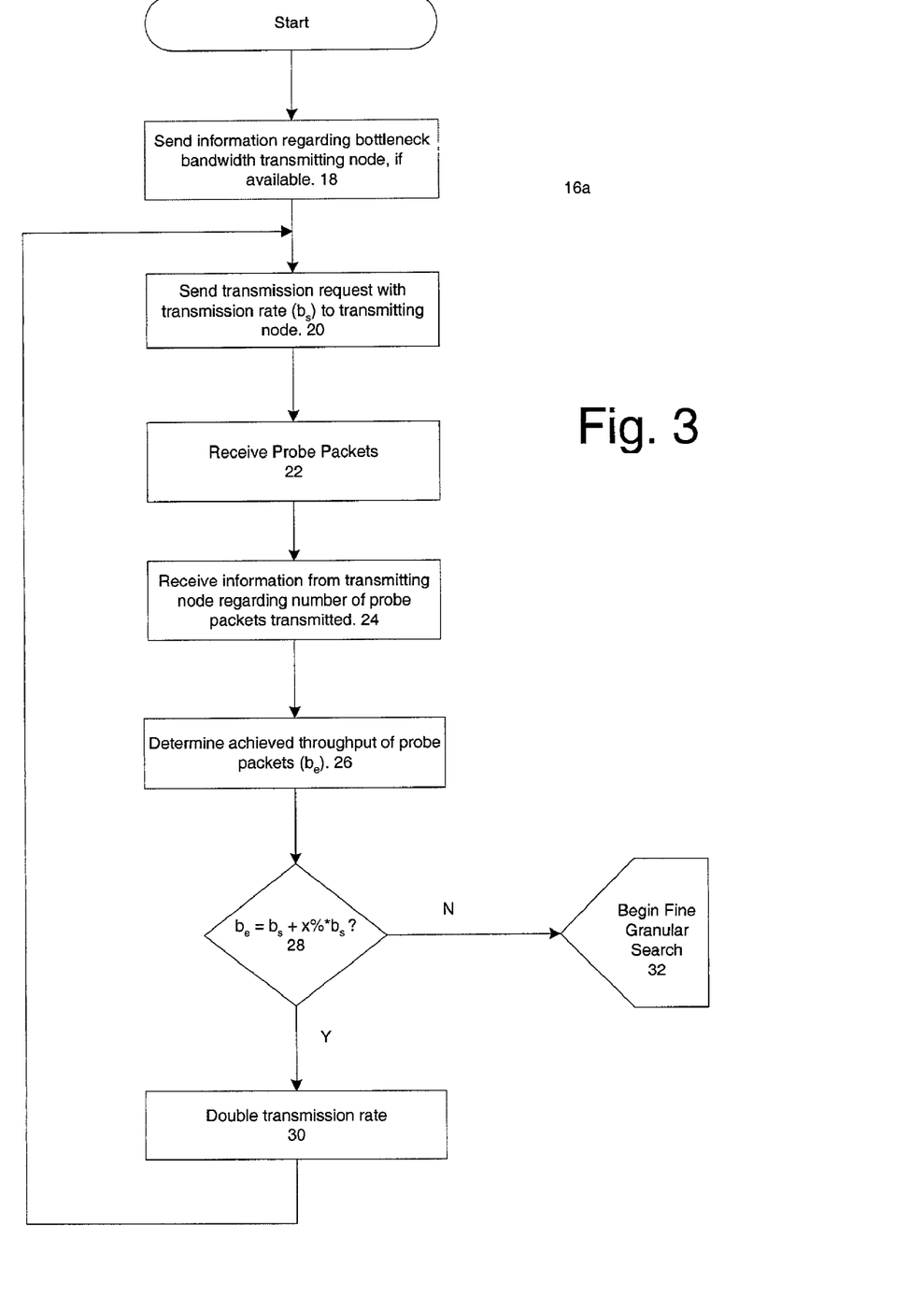
FIG. 3 is a flow chart illustrating a portion of an algorithm that is used at the receiver end for estimating available bandwidth of a communication path between a sender node and a receiver node that is an embodiment of the present invention.

Referring now to FIG. 3, a flow chart 16a that illustrates a portion of the present algorithm for estimating the available bandwidth is shown. Before the probing starts, the sender sets up the control channel with the receiver and conveys information regarding the bottleneck bandwidth, if that information is available (step 18). The receiver then sends a request to start the probing process with a certain initial probe package transmission rate (step 20). It also specifies how long probe packets are going to be sent at this rate.

After the sender has transmitted the probing packets (step 22), it informs the receiver over the control channel about the number of packets it has sent (step 24) so that the receiver can determine whether it has received the correct number of packets. The receiver determines the achieved throughput ($b_e$) of the probe packets (step 26) and checks to see whether the achieved throughput deviates by more than $\epsilon$% (user selectable) of the sending rate (step 28). Recall that where the sending rate is less than the available bandwidth, the achieved throughput of the probe packets should be equal to the sending rate. To account for the effects of noise, however, a variable $\epsilon$ is selected so that small deviations between the sending rate and the achieved throughput are accommodated.

If the achieved throughput is within the acceptable noise range, the receiver instructs the sender to increase the sending rate ($b_s$) by two (2) (or more, if desired) times (in cases where information regarding the bottleneck bandwidth is not available this may be increased by, say 10 times to allow the algorithm to converge more quickly) (step 30). This process continues until it reaches a point where the deviation of be is higher than $\epsilon$% of $b_s$. This is an indication that the sending rate has exceeded the available bandwidth (i.e., has entered the nonlinear portion of the graph shown in FIG. 2). At such a point, the algorithm enters a fine granular bandwidth search phase (step 32).

The flow chart of FIG. 3 is one possible implementation of an algorithm for estimating bandwidth. Another implementation is presented in FIGS. 9a and 9b. These diagrams present a pseudo-code implementation of a procedure called "exp_growth". Procedure exp_growth runs at the receiver node and returns a broad range of values for the available bandwidth. It starts with a low initial sending rate and then it increases the sending rate exponentially.

In procedure exp_growth, lines 1–4 of the subroutine deal with establishing a reliable TCP channel between the sender and the receiver and exchanging path information such as the bottleneck bandwidth, if known. Lines 5–10 relate to a process for finding an initial rate of probing and the subsequent rate of increase of the packet transmissions, based on the availability of the bottleneck bandwidth information. In lines 11–13 of the process, the control information is gathered and transmitted to the sender node so that it can use the information for sending probe packets at appropriate rates.

Lines 14–23 of this process relate to the actual processing of the probe and control packets that are received. The sender node, after sending the probe packets through the UDP channel for the required amount of time, sends the receiver node information regarding the round number, initial packet sequence number, last packet sequence number and sending rate so that the receiver node can determine whether the sender node has stopped sending probe packets. Packet ordering and packet losses are accounted for as are the time of arrival of first and the last probe packets. If time stamping operations were done at the application layer, inaccuracies would result. So, a better approach to provide quite accurate timing information is to use kernel level time stamping.

TCP packet losses or re-ordering may be used as indications of congestion. If packet re-ordering occurs, it implies that consecutive probe packets have not traveled along the same path and, hence, the argument for using the end-to-end measurements for the same path does not remain valid. For the tool described herein, if the packet losses or re-ordering persists for more than three rounds, we assume that the sending rate is higher than available bandwidth.

Figure 9B:
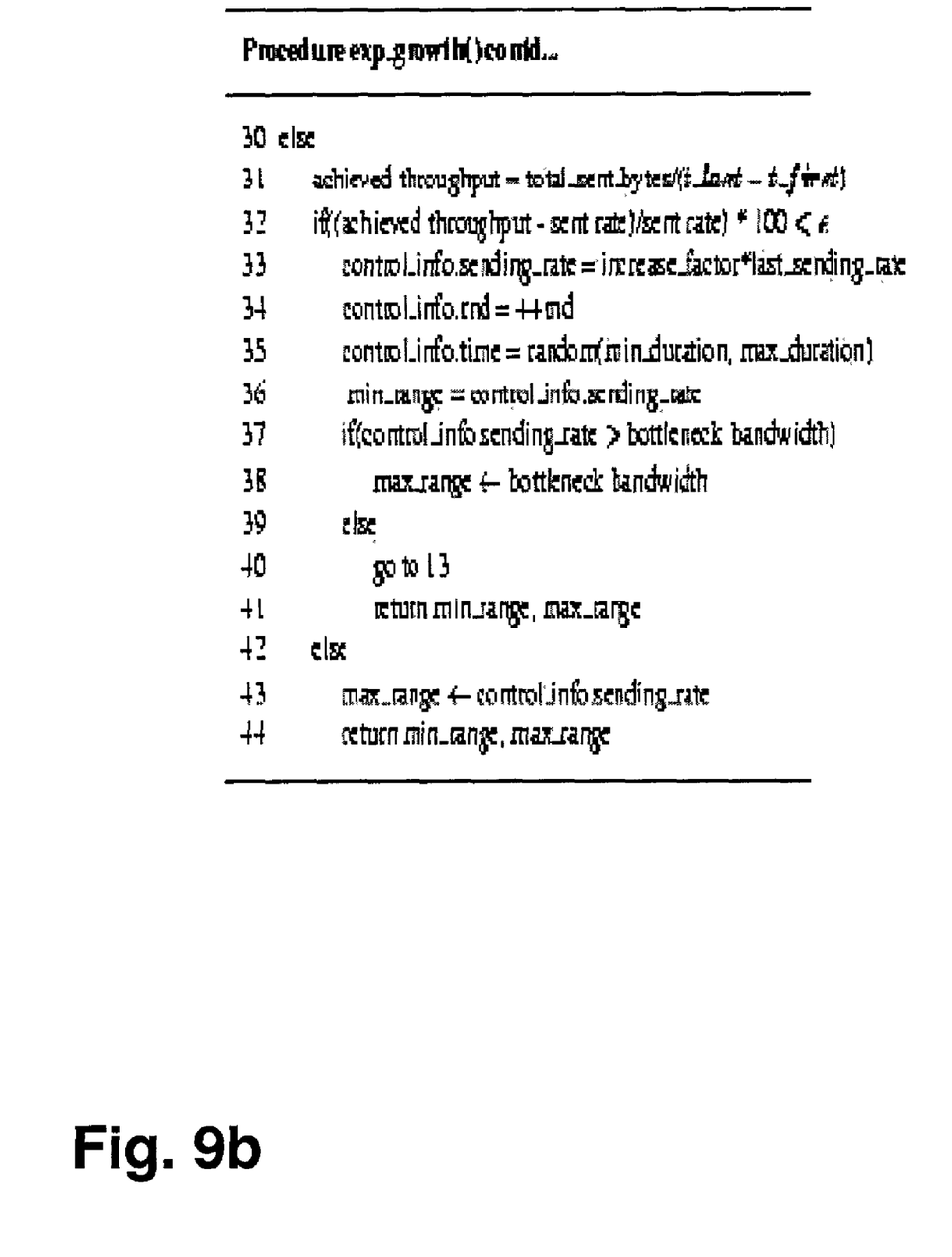

If no packet re-ordering or packet losses take place, then lines 31–44 of the process describe how to modify the sending rate. In lines 32–37, if the achieved throughput did not vary from the sending rate by less than $\epsilon$%, then the sending rate is increased by increase_factor. If the achieved throughput is found to be considerably less than the sending rate (lines 43–44), then the current sending rate would be the maximum value for the next level of search.

Figure 4:
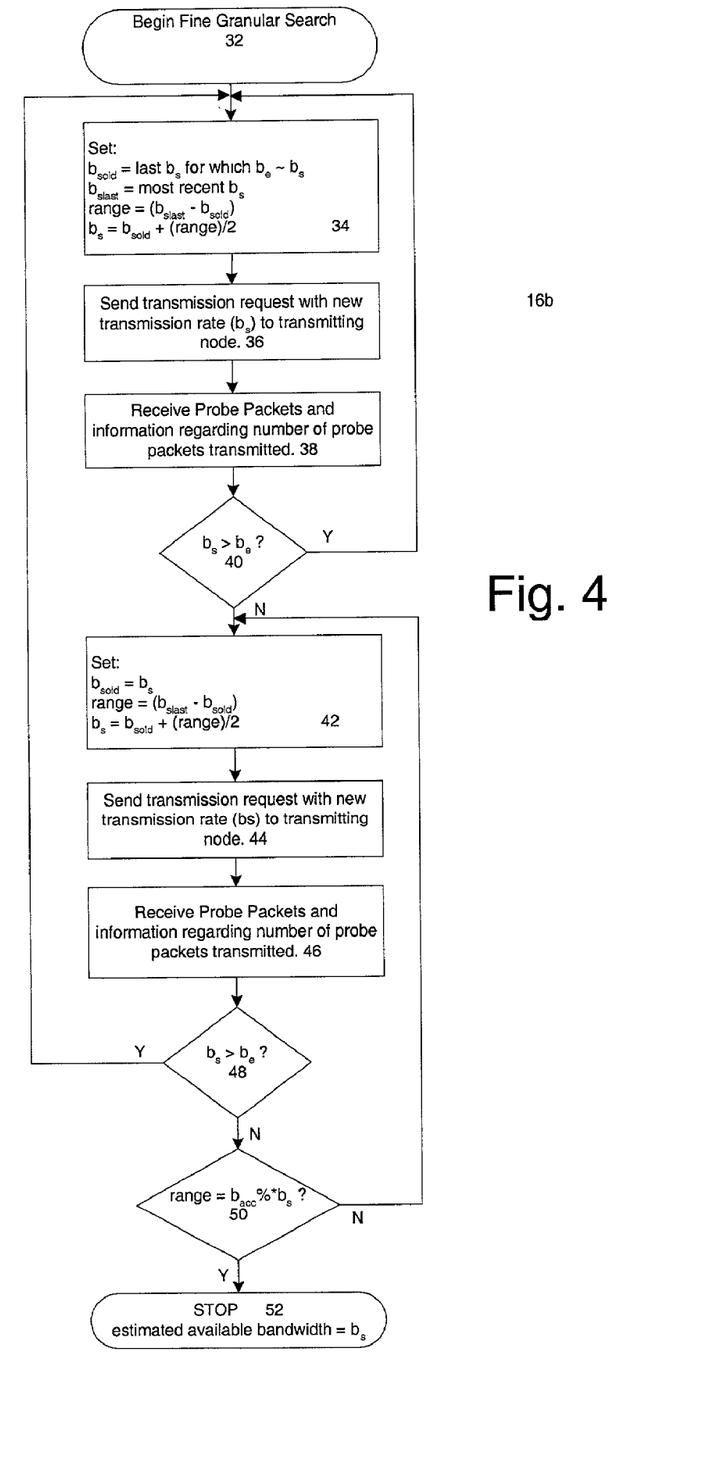
FIG. 4 is a flow chart illustrating a fine granular estimation phase of an algorithm that is used at the receiver for estimating available bandwidth of a communication path between a sender node and a receiver node that is an embodiment of the present invention.

FIG. 4 is a flowchart 16b, which illustrates the fine granular bandwidth search phase of the present invention. In this phase of the measurement, it is recognized that the last transmission rate exceeded the available bandwidth of the communication path. Therefore, the available bandwidth must lie between this (too fast) most recent transmission rate and the preceding one, which was the last transmission rate for which $b_s$ was approximately equal to $b_a$. Thus, a range is defined (step 34) as follows:

$$range = (b_{slast} - b_{sold}),$$

where $b_{slast}$ is the most recent transmission rate and $b_{sold}$ is the last transmission rate for which $b_s$ was approximately equal to $b_a$.

Then, a new transmission rate, $b_s$, is set, which is greater then the last transmission rate for which $b_s$ was approximately equal to $b_a$ by a fraction (e.g., one-half) of the range. Mathematically:

$$b_s = b_{sold} + (range)/2.$$

This new transmission rate is provided to the sender node (step 36) and, as before, a probe package is transmitted at this rate to the receiver. Following transmission, the sender node notifies the receiver of the number of packets in the probe package (step 38) and the receiver computes the new achieved throughput of the probe package ($b_e$). The transmission rate of the probe package is compared with the achieved throughput (step 40), and the process repeats, with a new range being defined, until the transmission rate is again approximately equal to the achieved throughput.

Once the transmission rate of the probe package is again approximately equal to (e.g., within $\epsilon\%$ of) the achieved throughput of the probe package, the $b_{sold}$ value is redefined (step 42) to be the last transmission rate (i.e., because there is now a new transmission rate for which $b_s$ is approximately equal to $b_e$). The range value is recomputed for the new $b_{sold}$ and a new transmission rate adopted in accordance therewith. Once again, the receiver notifies the sender node of the new transmission rate (step 44) and following transmission of a new probe package, the sender notifies the receiver of the number of probe packets transmitted (step 46). The receiver computes the achieved throughput and determines whether the transmission rate has exceeded the achieved throughput (step 48). If so, the process resets the range value using the current $b_{sold}$, otherwise a check is made to determine whether the current transmission rate is acceptable (step 50).

An acceptable transmission rate may be defined in either of two ways. In one case, an acceptable transmission rate will be the probe packet transmission rate for which a range value that is an acceptable fraction ($b_{acc}\%$) of the bottleneck bandwidth is found. Alternatively, the acceptable transmission rate will be found when the range/(last $b_s$ for which $b_s$ was approximately equal to be is true) is equal to $b_{acc}/100$. When the acceptable transmission rate is found using the fine granular bandwidth search process, the probing stops (step 54) and the estimated available bandwidth is defined as being equal to the current probe package transmission rate.

Figure 10A:
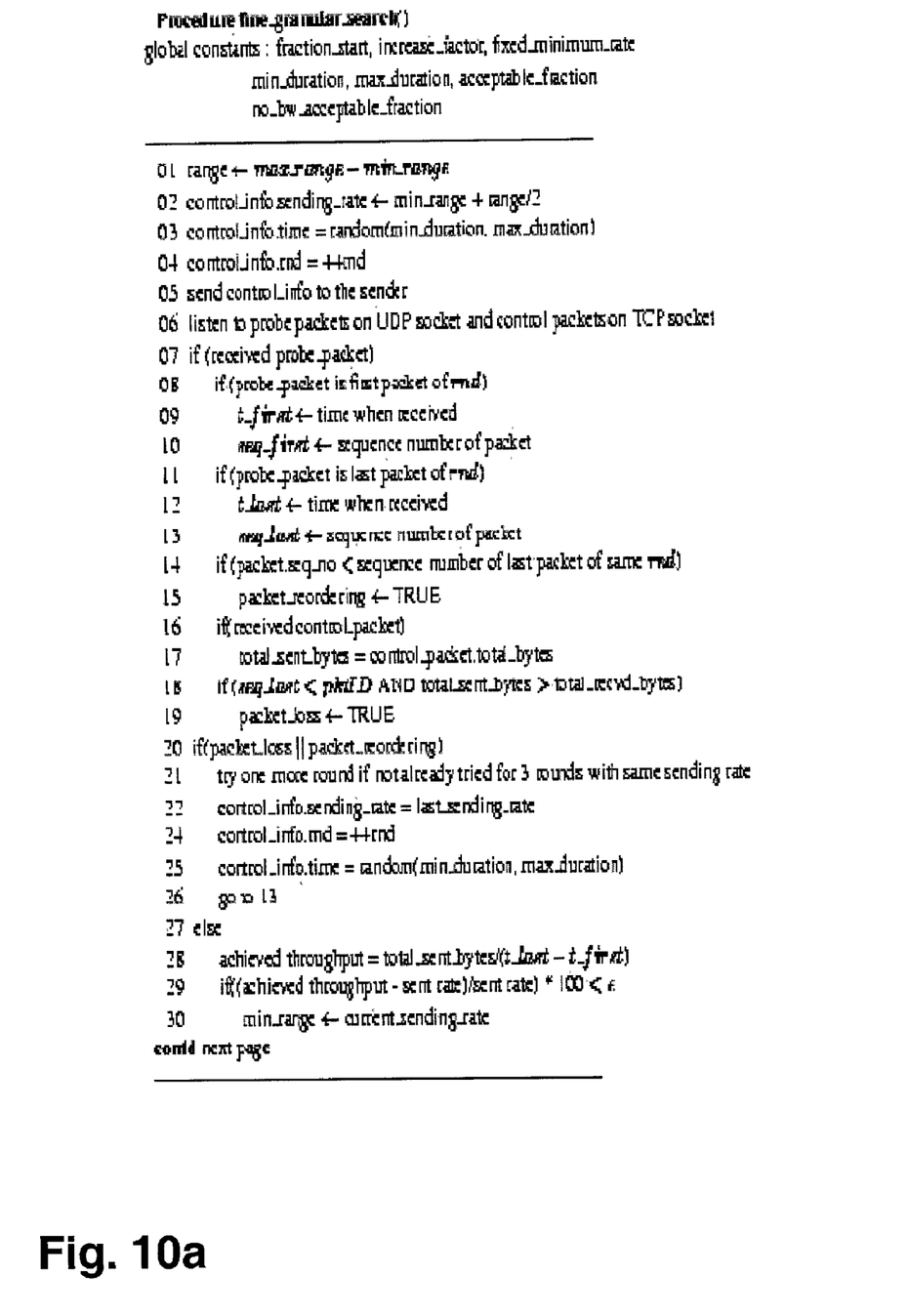
FIGS. 10a and 10b present a pseudo-code implementation of a fine granular estimation phase of an algorithm that is used at the receiver for estimating available bandwidth of a communication path between a sender node and a receiver node that is an embodiment of the present invention.
Figure 10B:
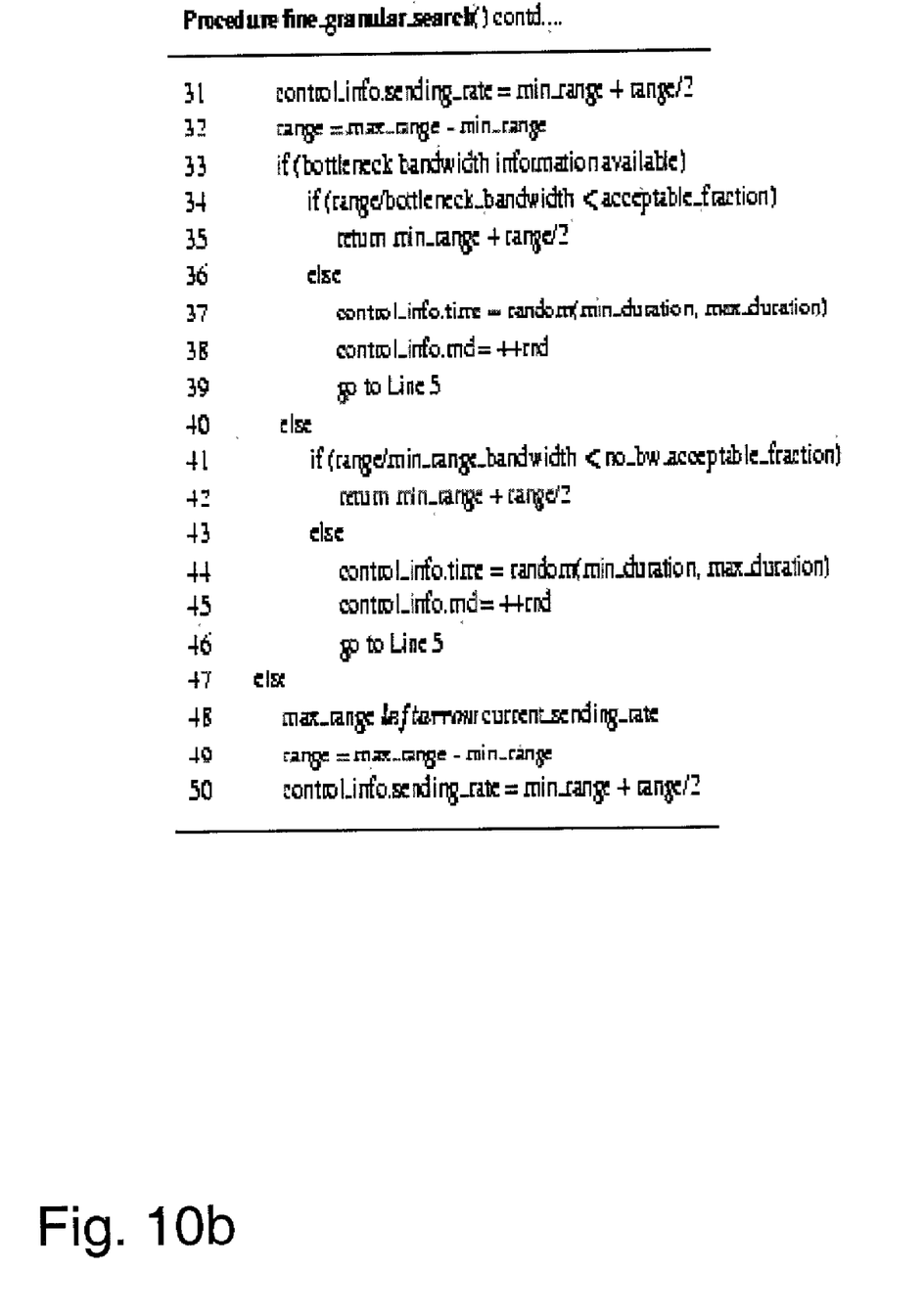

A further implementation of the fine granular search algorithm is presented in the pseudo-code representation of FIGS. 10a and 10b. The procedure fine_granular_search reduces the range (max_range–min_range$), obtained through procedure exp_growth to provide a reasonable estimate of the available bandwidth.

Figure 8:
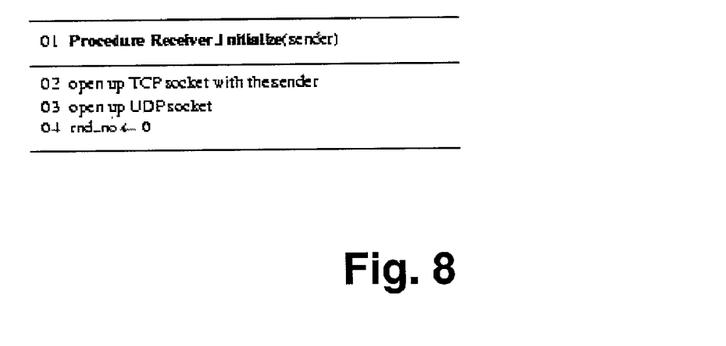
FIG. 8 presents a pseudo-code implementation of an initialization procedure for a receiver node configured in accordance with an embodiment of the present invention.
Figure 11:
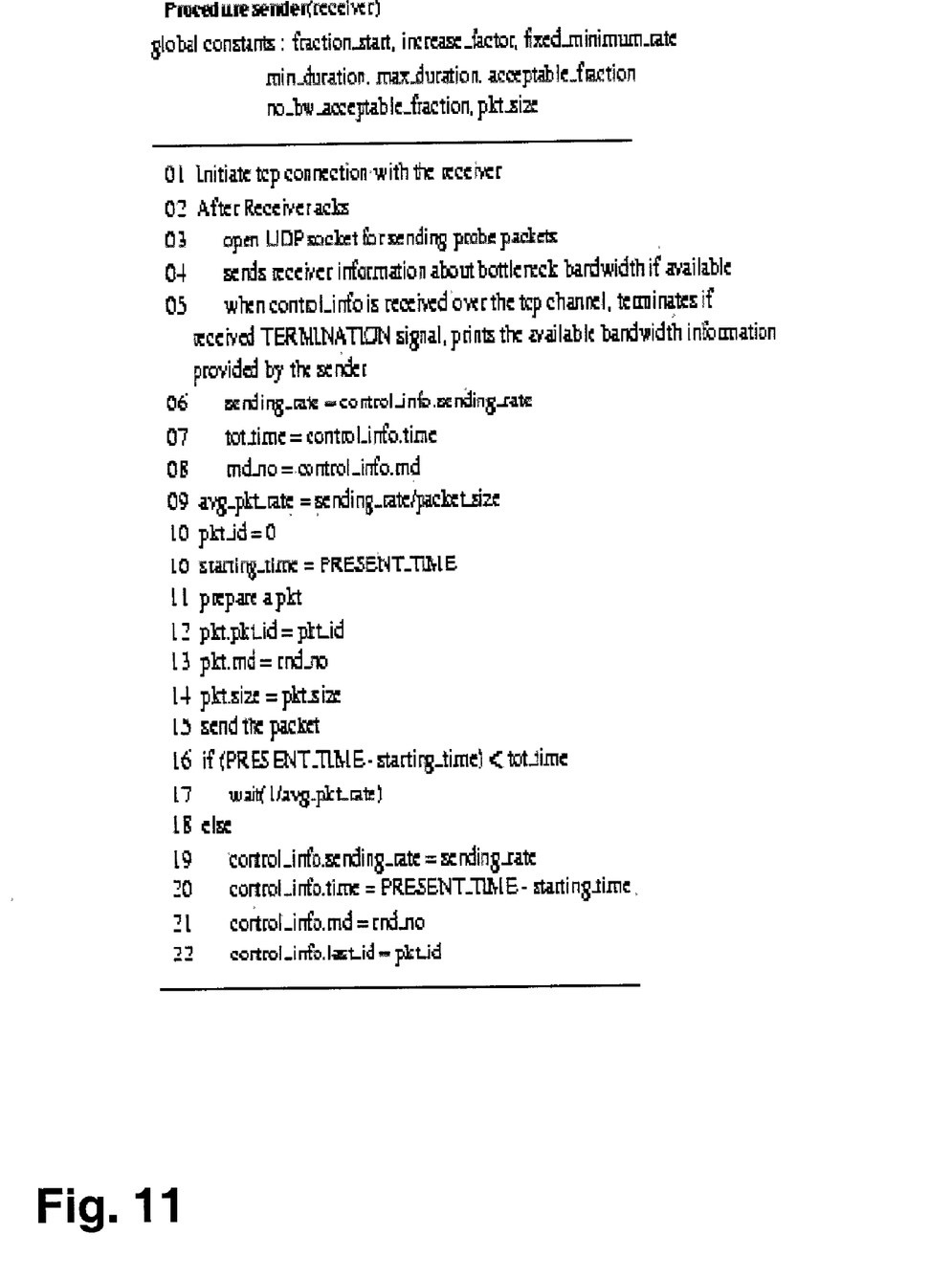
FIG. 11 presents a pseudo-code implementation of an algorithm for initializing a sender node and establishing a control channel between the sender node and a receiver node in accordance with an embodiment of the present invention.

To make use of the two pseudo-code implementations exp_growth and fine_granular_search, both the receiver node and the sender node need to be initialize. FIG. 8 provides a pseudo-code implementation (procedure Receiver_Initialize) of an initialization routine for the receiver node. The sender node initialization routine (procedure sender) is illustrated in FIG. 11.

Procedure sender takes the address of the receiver and attempts to first initiate the control channel (Line 1). Lines 4–22 describe the remaining flow of operation at the sender. The sender receives the control information from the receiver regarding the desired sending rate and sends probing UDP packets at that rate. The packets are sent as CBR (Constant Bit Rate) traffic. Once the probe packets have been sent for the required period of time, the sender informs the receiver about the details of the probing phase that includes information such as the total time of probing, the packet ID of the last packet, the round number and the actual sending rate. This process continues until the receiver informs the sender that the measurement is complete.

TABLE 1

Another example of the algorithm for determining available bandwidth.

| Sending Rate ($b_s$) | Relation with previous sending rates | Result of operation |
|---|---|---|
| $X_1$ | Starting point | < |
| $X_2$ | $X_1 * 2$ | < |
| $X_3$ | $X_2 * 2$ | > |
| $X_4$ | $X_2 + (X_3/2 - X_2/2)$ | > |
| $X_5$ | $X_2 + (X_4/2 - X_2/2)$ | < |
| $X_6$ | $X_5 + (X_4/2 - X_5/2)$ | < |
| $X_7$ | $X_6 + (X_4/2 - X_6/2)$ | = |

The above Table 1 illustrates the steps involved in the present algorithm for a hypothetical example. In this example, the initial probe package transmission rate is $X_1$ units, and it is subsequently doubled to $X_2$. Rate $X_2$ is then doubled to $X_3$. The operators <; >; =in the right-hand column of Table 1 denote whether $b_s$ has been inferred to be less than, greater than or equal to $b_a$, the available bandwidth. If the achieved throughput ($b_e$) is within $\epsilon\%$ of $b_s$, then the inference is <, i.e., $b_s < b_a$, otherwise the inference is $b_s > b_a$. When $b_s = X_3$, it has been inferred for the first time that $b_s > b_a$. So it now becomes clear that ($X_3 - X_2$) is the range for the available bandwidth.

In the next step, a fine granular search is done where the range is halved in each iteration, until the range becomes $b_{acc}\%$ (acceptable range) of the bottleneck bandwidth. (In cases where the bottleneck bandwidth information is unknown, a range would be acceptable if range/(last $b_s$ where < is true) is equal to $b_{acc}/100$). A transmission rate corresponding to the midpoint of the range can then be used as the estimated available bandwidth. The steps involved in the fine granular bandwidth search have been explained below and FIGS. 5, 6 and 7 show graphically how the sending rates vary during the probing process.

As indicated above, the initial range is determined to be ($X_3 - X_2$). So the next value of $b_s$ ($X_4$) is set as $X_2 + (X_3 - X_2)/2$. The receiver conveys this information to the sender using the TCP control channel. At transmission rate $X_4$, $b_s > b_a$. Thus, the next probe package transmission rate, $X_5$, is chosen to be $X_2 + (X_4 - X_2)/2$ (where the range is $X_4 - X_2$). This process continues until we reach transmission rate $X_6$ and $(X_4-X_6)=b_{acc}$ % of the bottleneck bandwidth. Then, $X_7=X_6+(X_4-X_6)/2$ is chosen as the estimated available bandwidth.

Figure 5:
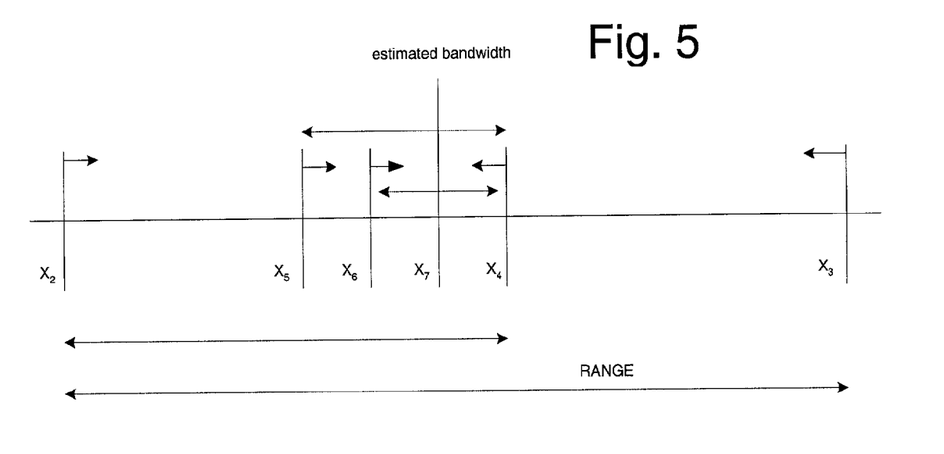
FIG. 5 illustrates graphically the manner in which successive approximations converge to an estimate of the available bandwidth of a communication path between a sender node and a receiver node when probe traffic is transmitted between these nodes in accordance with the methods of the present invention.

In FIG. 5, the process of successively halving the range to allow the algorithm to converge towards the estimated available bandwidth is shown. Notice that when the transmission rate exceeds the achieved throughput of the probe packages, the transmission rate is reduced. At other times, when the transmission rate is approximately equal to the achieved throughput, it is increased, up to the point where the range is within the acceptable value of the bottleneck bandwidth (if known) or the current transmission rate.

Figure 6:
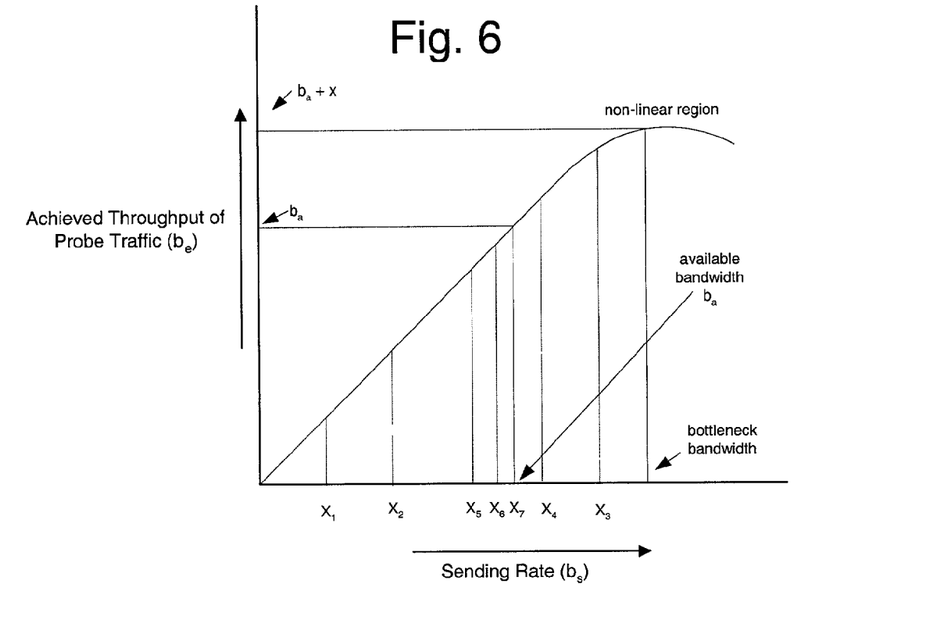
FIG. 6 presents similar information to that displayed in FIG. 5, using the graphical representation format of FIG. 2.
Figure 7:
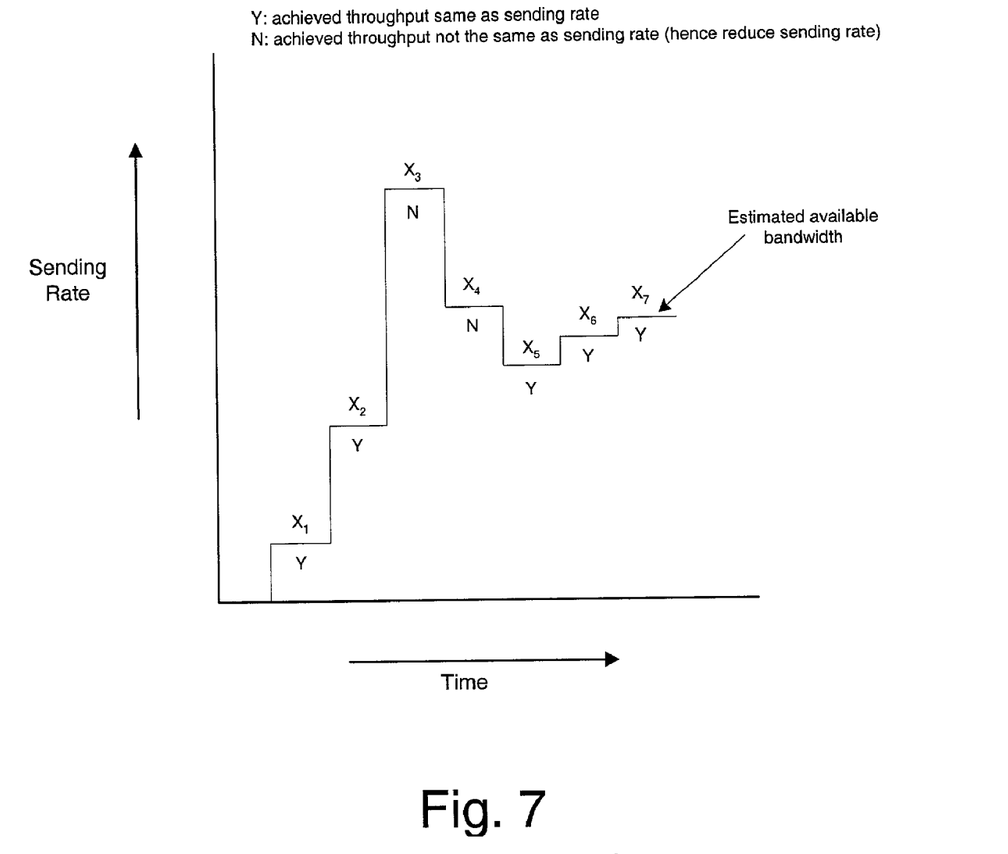
FIG. 7 illustrates graphically the manner in which estimates of available bandwidth of a communication path between a sender node and a receiver node converge using the methods of the present invention.

FIG. 6 presents the same information in a format similar to that shown in FIG. 2. Here, one can see that when the transmission rate exceeds the achieved throughput, the probe packages are being transmitted in the nonlinear range. The estimated actual bandwidth of the communication path exists within the liner range of the plot, at a point where congestion just begins to occur.

FIG. 7 presents the information in yet one more form. This time the sending rate of the probe packets has been plotted against time. As shown, the sending rate is varies until the algorithm converges to the estimated available bandwidth in accordance with the above-described rules. The probe packets sent are UDP packets over the communication path while other sender-receiver communication occur using the TCP-based reliable control channel. The traffic on the control channel will be minimal, and hence it will not affect the available bandwidth measurements.

Thus, a scheme for finding the available bandwidth along any communication path between two end points on a computer network or internetwork such as the Internet has been described. Although discussed with reference to several illustrated examples, the present invention should not be interpreted as being limited to those examples. Instead, the invention should only be measured in terms of the claims, which follow.

What is claimed is:

1. A method, comprising determining an available bandwidth of a communication path between two nodes of a computer network communicatively coupled by the communication path using probe packages that are transmitted between a sender one of the nodes and a receiver one of the nodes via the communication path at varying transmission rates, each successive transmission rate being selected according to: (i) an achieved throughput for a transmission of a preceding one of the probe packages, and (ii) a deviation between the achieved throughput for the transmission of the preceding one of the probe packages and a corresponding transmission rate of the preceding one of the probe packages, wherein the varying transmission rates are increased for successive transmission of probe packages until a probe package transmission rate ($t_s$) exceeds a corresponding achieved probe package throughput ($t_e$) over the communication path, wherein once $t_s$ exceeds $t_e$, the varying transmission rates are increased over a last transmission rate ($t_r$) for which the probe package transmission rate did not exceed a corresponding achieved probe package throughput over the communication path by a fraction of a transmission rate range defined by a difference between $t_s$ and $t_r$, until $t_s$ no longer exceeds $t_r$.

2. The method of claim 1, wherein selection of a first one of the transmission rates for the probe packages is performed with knowledge of a bottleneck bandwidth for the communication path.

3. The method of claim 1, wherein selection of a first one of the transmission rates for the probe packages is performed without knowledge of a bottleneck bandwidth for the communication path.

4. The method of claim 1, wherein the probe packages comprise a number of packets.

5. The method of claim 4, wherein the sender one of the nodes advises the receiver one of the nodes of the number of packets comprising each of the probe packages.

6. The method of claim 5, wherein the sender one of the nodes advises the receiver one of the nodes of the number of packets comprising each of the probe packages via a control channel between the two nodes.

7. The method of claim 6, wherein communication between the two nodes over the control channel takes place using a reliable transmission protocol.

8. The method of claim 7, wherein the reliable transmission protocol comprises a transmission control protocol (TCP).

9. The method of claim 7, wherein prior to transmission of a first one of the probe packages, the receiver one of the nodes receives from the sender one of the nodes bottleneck bandwidth information of the communication path.

10. The method of claim 9, wherein the receiver one of the nodes advises the sender one of the nodes of the bottleneck bandwidth using the control channel.

11. The method of claim 1, wherein the receiver one of the nodes instructs the sender one of the nodes regarding a first transmission rate to use for a first one of the probe packages.

12. The method of claim 11, wherein instructions from the receiver one of the nodes to the sender one of the nodes are communicated using a control channel.

13. The method of claim 12, wherein communications using the control channel make use of a reliable communication protocol.

14. The method of claim 13, wherein the reliable communication protocol comprises a transmission control protocol (TCP).

15. The method of claim 1, wherein each of the probe packages comprises a number of user datagram packets (UDPs).

16. The method of claim 1, wherein once $t_s$ no longer exceeds $t_r$, the varying transmission rates are again increased up to an estimated available bandwidth of the communication path by using $t_s$ as a new value for $t_r$ and adding the fraction of the transmission rate range to this new value of $t_r$.

17. The method of claim 16 wherein the estimated available bandwidth of the communication path is determined as being one of (i) an acceptable fraction of a bottleneck bandwidth of the communication path, or (ii) a value of the achieved probe packet throughput that is within an acceptable percentage of a corresponding probe package transmission rate.

* * * * *

UNITED STATES PATENT AND TRADEMARK OFFICE
CERTIFICATE OF CORRECTION

PATENT NO. : 7,180,858 B1
APPLICATION NO. : 10/033502
DATED : February 20, 2007
INVENTOR(S) : Soumya Roy and Jose J. Garcia-Luna-Aceves It is certified that error appears in the above-identified patent and that said Letters Patent is hereby corrected as shown below:

On Title Page

On page 1, item (75): delete "Jose J. Garcie-Luna-Aceves" and insert --Jose J. Garcia-Luna-Aceves--.

Column 4, line 10: delete "pathrate uses" and insert --Pathrate uses--.

Column 10, line 73: delete "be" and insert --$b_e$--.

Column 12, line 3: delete "initialize" and insert --initialized--.

Signed and Sealed this

Seventh Day of August, 2007

JON W. DUDAS
*Director of the United States Patent and Trademark Office*